United States Patent
Petrich et al.

(10) Patent No.: US 6,389,904 B1
(45) Date of Patent: *May 21, 2002

(54) MANIFOLD FOR USE WITH A PRESSURE TRANSMITTER

(75) Inventors: William E. Petrich, Golden Valley; David A. Broden, Minnetrista; Paul C. Sundet; Scott D. Nelson, both of Plymouth, all of MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 09/473,840

(22) Filed: Dec. 28, 1999

Related U.S. Application Data

(63) Continuation of application No. 08/974,614, filed on Nov. 19, 1997, now Pat. No. 6,009,758, which is a continuation of application No. 08/811,957, filed on Mar. 5, 1997, now abandoned, which is a continuation of application No. 08/536,324, filed on Sep. 29, 1995, now abandoned, which is a continuation-in-part of application No. 08/352,320, filed on Dec. 8, 1994, now abandoned.

(51) Int. Cl.⁷ .............................. G01L 7/00
(52) U.S. Cl. .................................... 73/756
(58) Field of Search ............. 73/756, 716, 717, 73/700; 137/597, 884

(56) References Cited

U.S. PATENT DOCUMENTS

| | | | | |
|---|---|---|---|---|
| 2,871,881 A | * | 2/1959 | Hewson | 137/597 |
| 4,182,362 A | | 1/1980 | Hewson et al. | 137/340 |
| 4,193,420 A | * | 3/1980 | Hewson | 137/356 |
| 4,466,290 A | | 8/1984 | Frick | 73/756 |
| 4,711,268 A | | 12/1987 | Coleman | 137/597 |

(List continued on next page.)

FOREIGN PATENT DOCUMENTS

| | | |
|---|---|---|
| EP | 0 770 863 A1 | 5/1997 |
| EP | 0 770 864 A1 | 5/1997 |
| GB | 2 086 535 A | 5/1982 |
| GB | 2 260 387 A | 4/1993 |
| GB | 2 271 164 A | 4/1994 |
| WO | WO 93/05329 | 3/1993 |
| WO | WO 96/06338 | 2/1996 |

OTHER PUBLICATIONS

Catalog: "M6A 5–Valve Meter Manifold," *AGCO Manifolds*, Anderson, Greenwood & Co., Houston TX 77081, Oct. 1980.
"New Compact Direct–Mount™ System Eliminates Need for Coplanar Flange", PGI International, 16101 Vallen Drive, Houston TX 77041 Sep. 19, 1995.
"Integral Manifolds" brochure, PGI International, 16101 Vallen Drive, Houston, TX 77041 (undated).
AGCO Manifolds Catalog, Anderson, Greenwood & Co., Houston, revised Oct. 1980, pp. 8, 17 and 28.
"In head–to–head testing, our Pressure–Core® Seal outperforms the leading valve manufacturer's design", PGI International.
"Fugitive Emission Manifold", PGI International, 16101 Vallen Drive, Houston X 77041 Oct. 2, 1995.
AGCO Manifolds Catalog, Anderson, Greenwood & Co., Houston, revised Oct. 1980, pp. 1–29.

*Primary Examiner*—Max Noori
(74) *Attorney, Agent, or Firm*—Westman, Champlin & Kelly, P.A.

(57) ABSTRACT

A manifold includes a body having generally planar inlet surface. The inlet surface includes a first inlet and a second inlet adapted for coupling to a pressurized process fluid. An outlet surface on the manifold is adapted for coupling to a co-planar transmitter and is at angle relative to the inlet surface. The manifold includes an equalizing valve surface opposite the outlet surface, and a perimeter therebetween. The outlet surface includes first and second outlets in fluid communication with the first and second inlets, respectively.

40 Claims, 16 Drawing Sheets

U.S. PATENT DOCUMENTS

| | | | |
|---|---|---|---|
| 4,745,810 A | 5/1988 | Pierce et al. | 73/706 |
| 4,798,089 A | 1/1989 | Frick et al. | 73/706 |
| 4,977,917 A | 12/1990 | Adams | 137/597 |
| D317,266 S | 6/1991 | Broden et al. | D10/46 |
| 5,036,884 A | 8/1991 | Miller et al. | 137/597 |
| 5,209,258 A | 5/1993 | Sharp et al. | 137/343 |
| 5,277,224 A | 1/1994 | Hutton et al. | 137/597 |
| RE34,610 E | 5/1994 | Miller et al. | 137/597 |
| 5,449,294 A | 9/1995 | Rench et al. | 437/225 |
| 5,494,071 A | 2/1996 | Bell et al. | 137/597 |
| 6,009,758 A * | 1/2000 | Petrich et al. | 73/756 |

\* cited by examiner

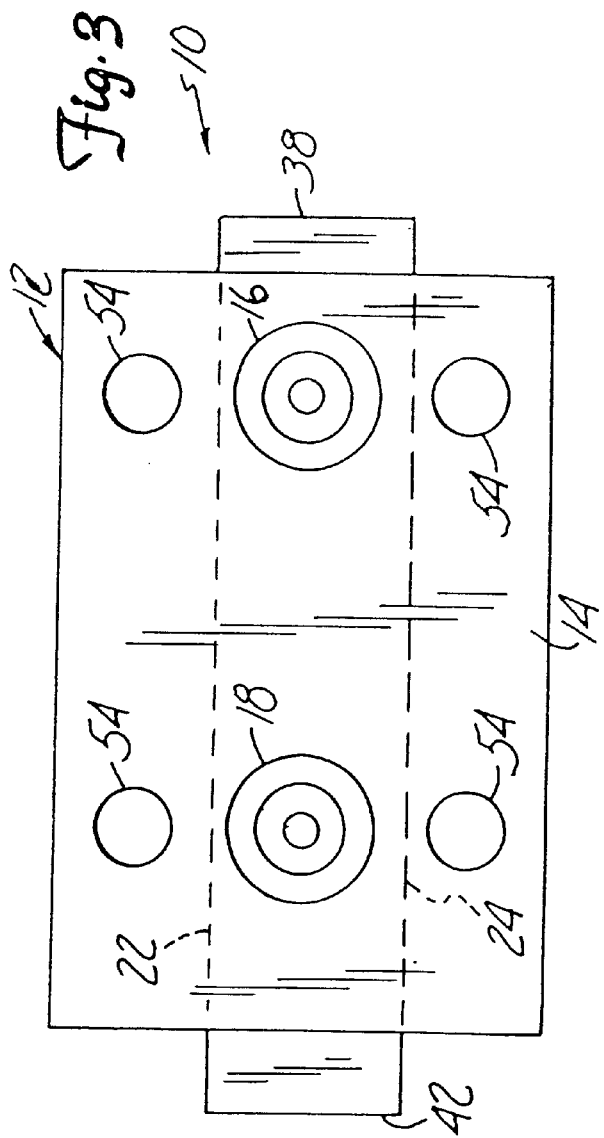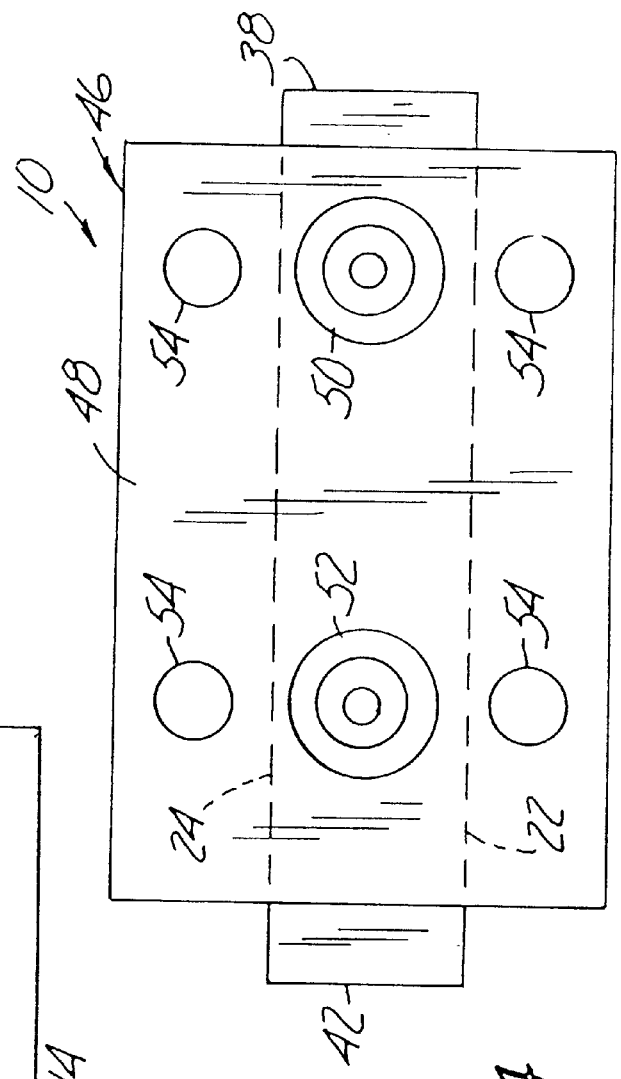

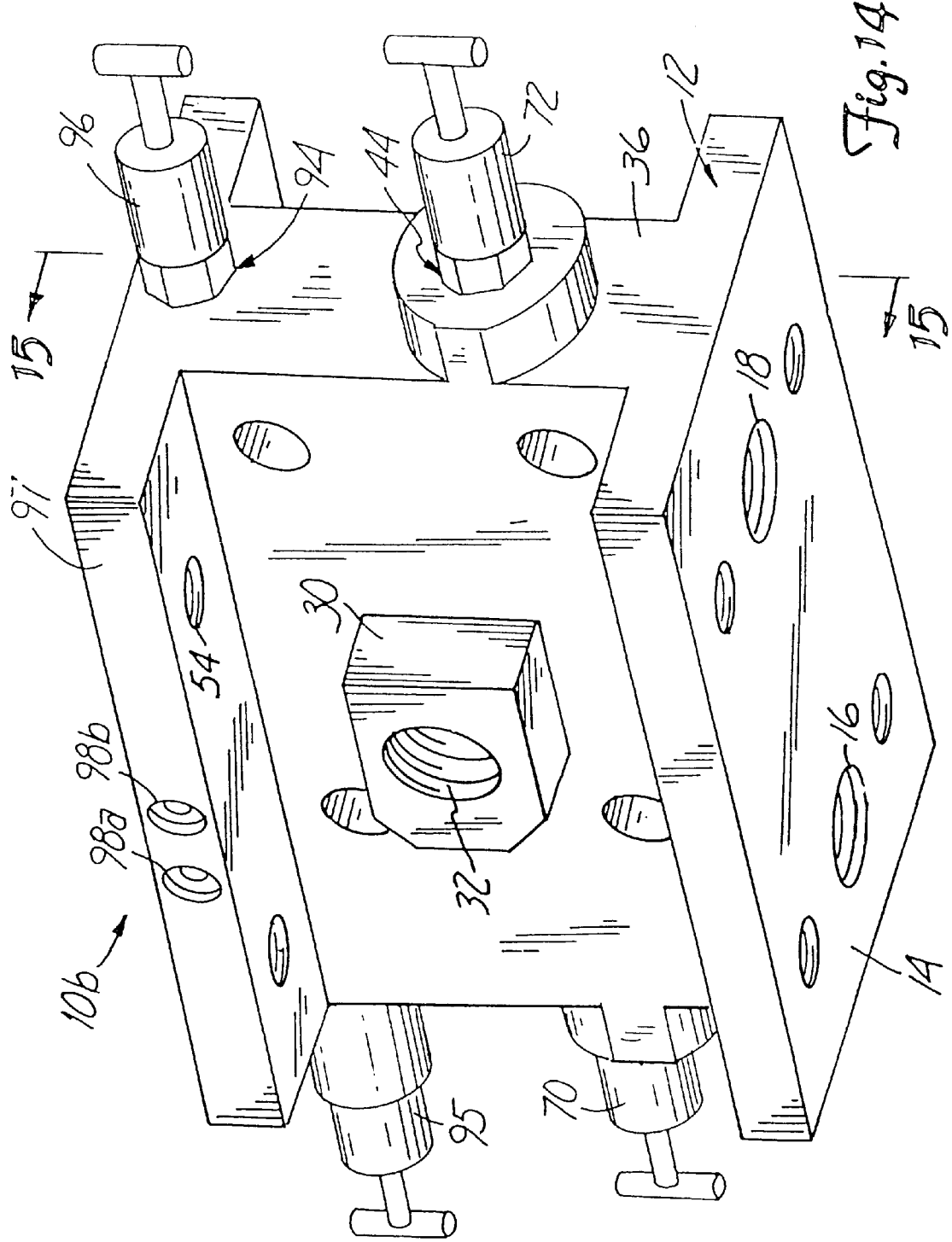

MANIFOLD FOR USE WITH A PRESSURE TRANSMITTER

REFERENCE TO CO-PENDING APPLICATION

The present application is a Continuation application of U.S. Ser. No. 08/974,614, filed Nov. 19, 1997 now U.S. Pat. No. 6,009,758; which is a Continuation of U.S. Ser. No. 08/811,957, filed Mar. 5, 1997 now abandoned; which is a Continuation of U.S. Ser. No. 08/536,324, filed Sep. 29, 1995 now abandoned; which is a continuation-in-part of application Ser. No. 08/352,320 filed on Dec. 8, 1994, and now abandoned.

BACKGROUND OF THE INVENTION

The present invention relates to a field mounted measurement transmitter measuring a process variable representative of a process. More particularly, the invention relates to a manifold for use with a transmitter for coupling the transmitter to process fluid transmitting fluid pressure to a differential pressure sensing means.

It has been an industry standard practice to use a flange adaptor and valve manifold to couple process conduits to pressure transmitters. The manifold connects a process conduit carrying a pressurized fluid to the flanged surface on a pressure transmitter. Often times, an H-shaped manifold is used between the conduit and the transmitter flange. Typically, manifolds had an inlet surface for receiving a process fluid opposite an outlet surface connected to the transmitter. In other words, the inlet surface was parallel to the outlet surface. Furthermore, manifolds were used with additional flanges or adaptor plates to attach the transmitter or process conduit. These assemblies are large, heavy, take up space, and have a number of joints and connections which promotes leaking of the fluid, and do not provide flexibility in installation.

Additionally, certain transmitter applications have specific requirements during transmitter use placing demands on the manifold which must be satisfied. For example, in the natural gas industry measurement accuracy is vital and must be taken into consideration when installing a manifold. In the power industry, in process calibration is important, and must be considered when installing a manifold.

Co-planar manifolds (for example, U.S. Pat. No. 4,745, 810), eliminate the need for a flange between the transmitter and the manifold. Some co-planar manifolds, however, require a flange.

There is a continuing need for a space-saving manifold used to couple pressure transmitters to process conduits which inhibits leaking and which permits flexibility and ease in installation and use.

SUMMARY OF THE INVENTION

A manifold includes a body having generally planar inlet surface. The inlet surface includes a first inlet and a second inlet, adapted for coupling to a pressurized process fluid. An outlet surface on the manifold is adapted for coupling to a co-planar transmitter and is at a right angle relative to the inlet surface. The manifold includes an equalizing valve surface opposite the outlet surface, and a perimeter therebetween.

The outlet surface includes first and second outlets in fluid communication with the first and second inlets, respectively. Isolator valves selectively isolate the outlets from the inlets. In one embodiment, an equalizer valve selectively couples the first outlet to the second outlet and a vent valve selectively vents the first outlet and the second outlet to the atmosphere. In another embodiment, two equalizer valves and vent valve are utilized.

BRIEF DESCRIPTION OF THE DRAWINGS

FIG. 3 shows a first end view of the manifold of FIG. 1.

FIG. 4 shows a second end view of the manifold of FIG. 1.

FIG. 14 shows a perspective view of another manifold embodying features of the present invention.

DETAILED DESCRIPTION OF THE PREFERRED EMBODIMENTS

Figure 1:
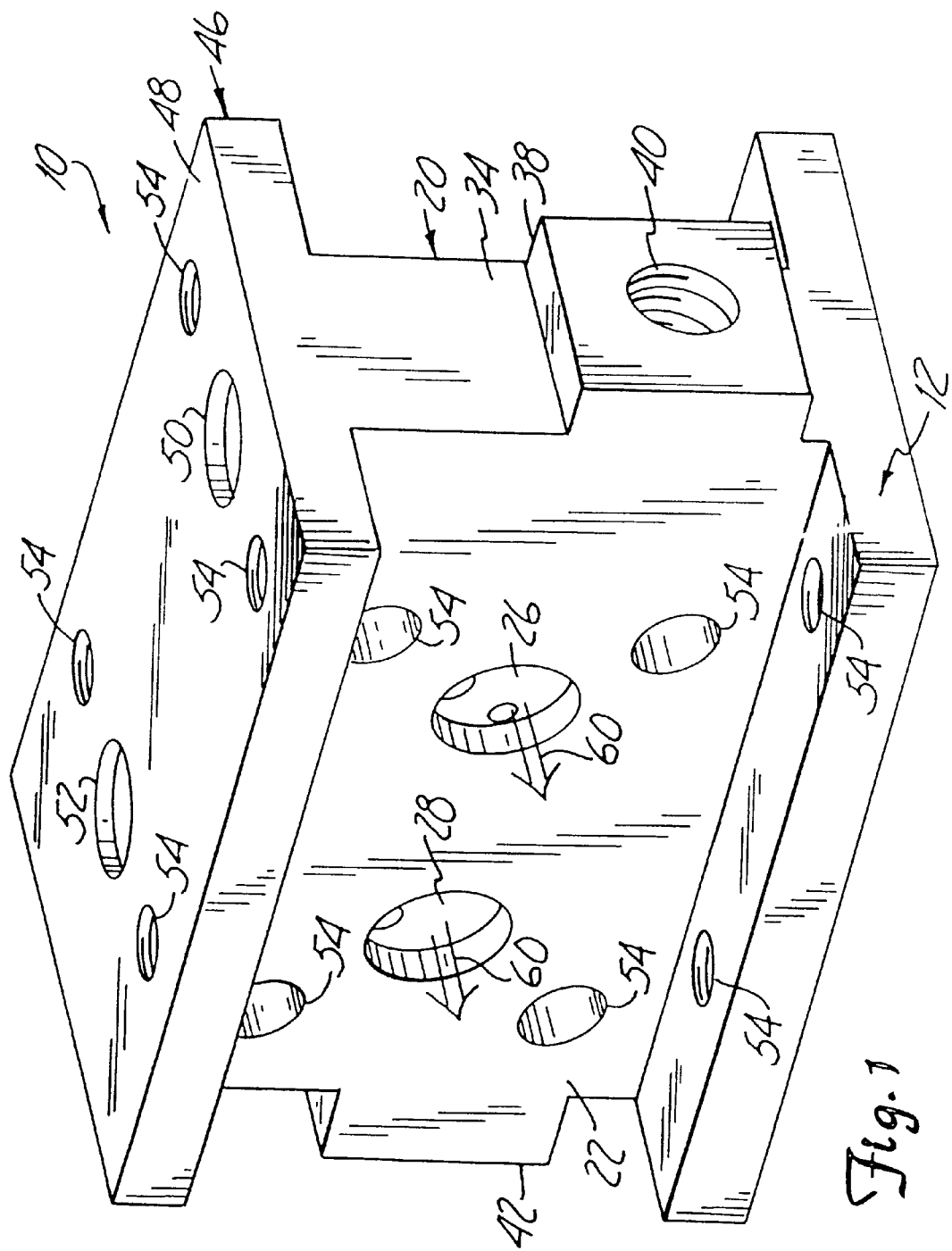
FIG. 1 shows a perspective view of a manifold embodying features of the present invention.
Figure 2:
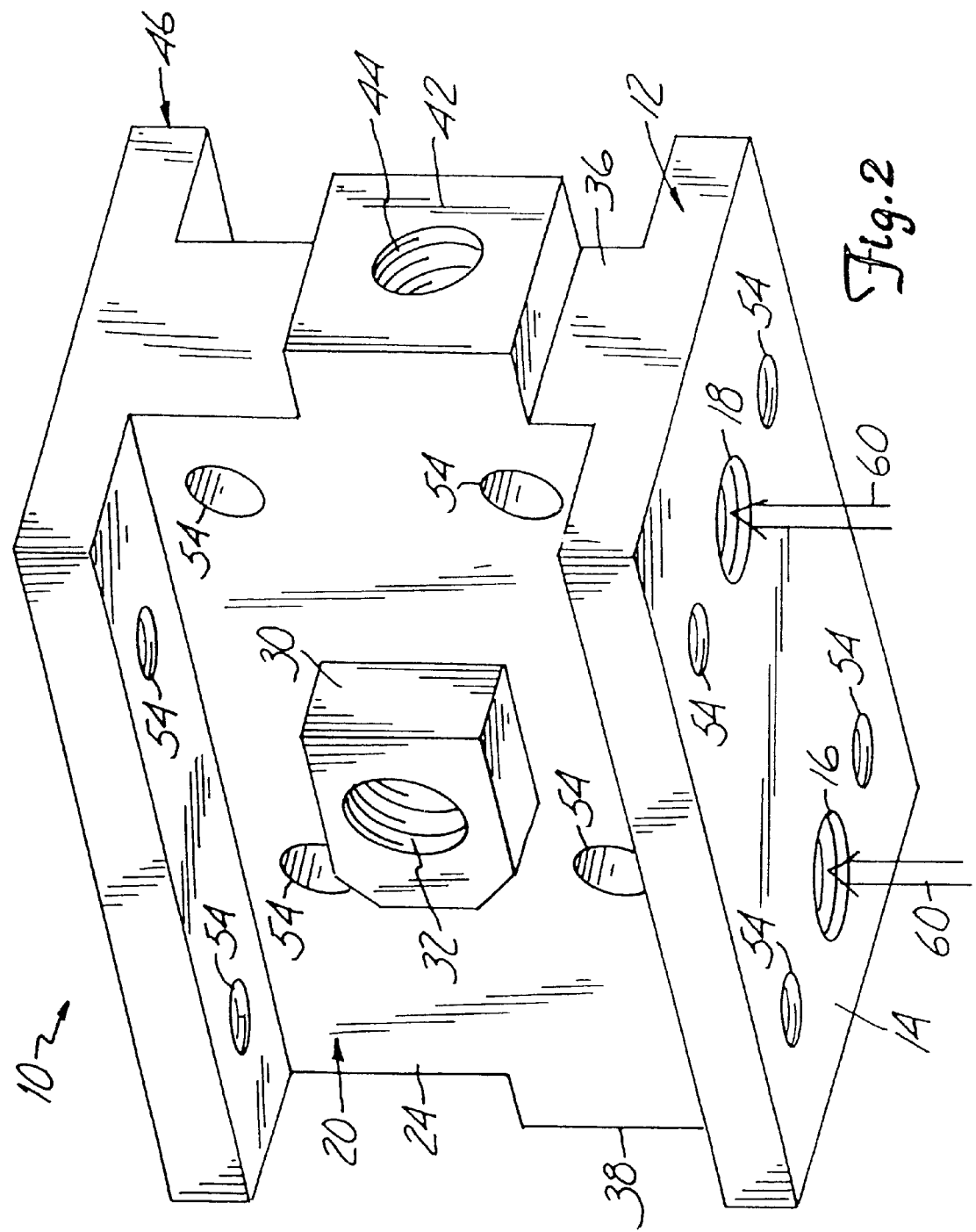
FIG. 2 shows another perspective view of the manifold of FIG. 1.

A manifold constructed in accordance with the present invention is shown in FIGS. 1–12 and is indicated generally at 10. As shown in FIGS. 1 and 2, manifold 10 is preferably a single cast piece and having an "H"-shaped body cross-section which includes a first member 12, second member 20, and third member 46. The first and third members 12, 46 act as side portions while the second member 20 acts as a cross portion therebetween. Generally planar first member 12 includes an inlet surface 14. Inlet surface 14 is provided with a first inlet 16 and a second inlet 18.

Planar second member 20 is generally perpendicular to first member 12 and generally upstanding thereon. Second member 20 includes an outlet surface 22 and an equalizing valve surface 24 generally opposite and parallel to outlet surface 22. Outlet surface 22 is provided with a first outlet 26 and a second outlet 28. Outlets 26 and 28 are spaced apart by generally 1.3 inches (3.3 centimeters) (DIN) and adapted for direct coupling to a co-planar transmitter of the type shown in U.S. Pat. No. Des. 317,266 commonly assigned with the present application. In contrast, conventional transmitters have a spacing of 2⅛ inches (5.4 centimeters) (DIN). Equalizing valve surface 24 is provided with a boss 30 having an equalizing chamber 32 Second member 20 also comprises a first perimeter wall 34 and a second perimeter wall 36. First perimeter wall 34 is provided with a boss 38 having a first blocking chamber 40 therein. Second perimeter wall 36 is provided with a boss 42 having a second blocking chamber 44 therein.

A generally planar third member 46 is perpendicular to the second member 20 and generally parallel to first member 12. Third member 46 includes a venting surface 48 opposite from inlet surface 14. Venting surface 48 is provided with a first vent 50 and a second vent 52. In a preferred embodiment, the spacing between vents 50 and 52 is 2⅛ inches (5.4 centimeters) (DIN). A plurality of spaced-apart mounting holes 54 are provided.

Figure 12:
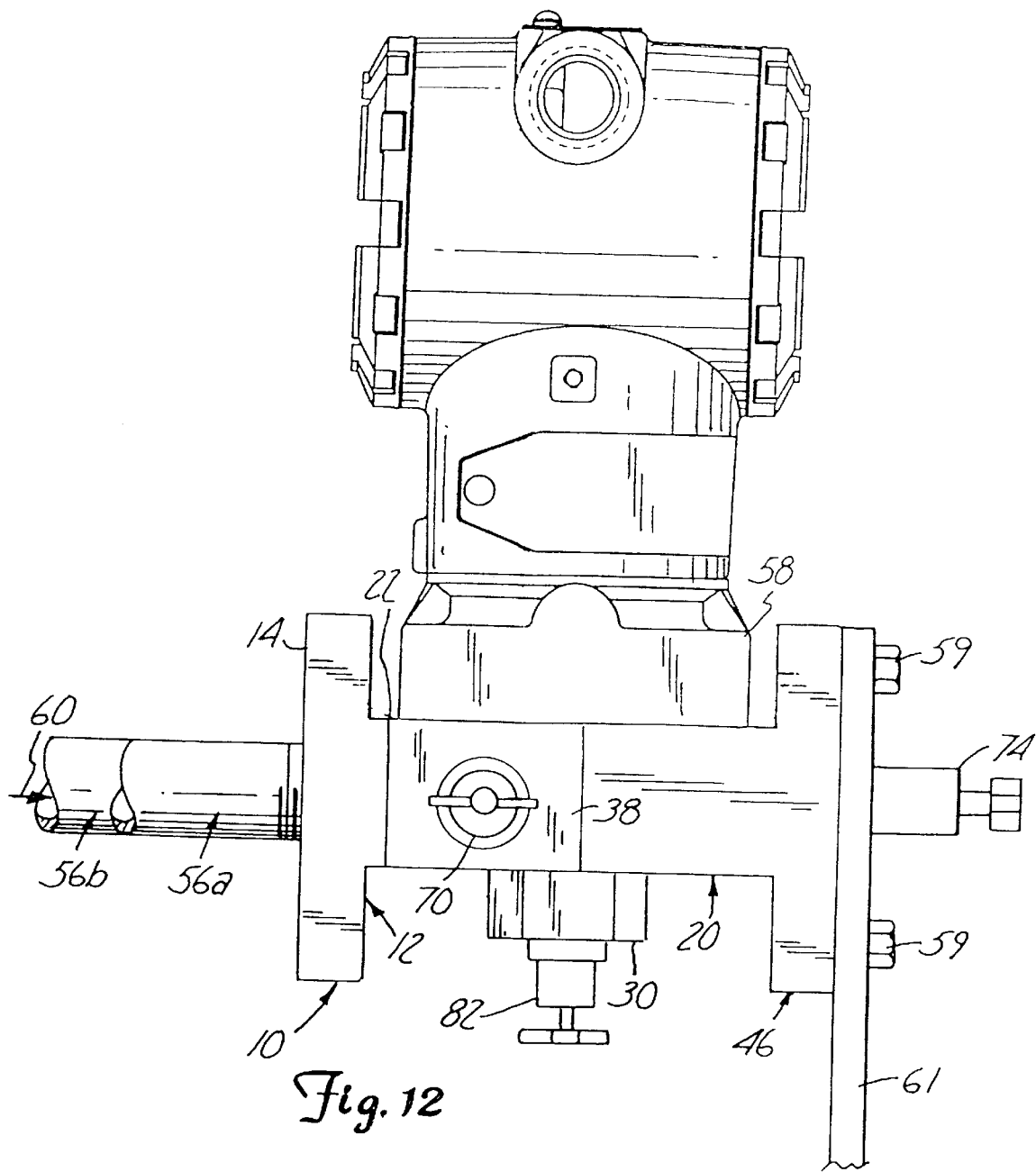
FIG. 12 is a side view of the manifold of FIG. 1, shown connected to the transmitter and the process conduit.

FIG. 12 shows a process conduits 56a, 56b connected to inlets 16, 18 and a transmitter housing 58 connected to outlets 26, 28. Fluid preferably flows into manifold 10 in a direction indicated by arrows 60 at inlets 16, 18 and out of the manifold 10 at either or both outlets 26, 28 into transmitter 58, or either or both vents 50, 52 to the atmosphere or other containment or pressure source during calibration. Manifold 10 is attached to and supported by stand 61.

As also shown in FIG. 3, first member 12 is rectangular and inlets 16, 18 are recesses in generally planar inlet surface 14. Inlets 16, 18 are preferably provided between the planes of outlet surface 22 and equalizing valve surface 24. Mounting holes 54 extend through first member 12.

Inlets 16 and 18 are preferably threaded to receive a threaded low pressure and high pressure conduit containing the pressurized process fluid. Both of conduits 56 are connected directly to inlets 16, 18. It is to be understood, however, that other connection configurations, such as connection assemblies between conduits 56a, 56b and manifold 10 are contemplated. Inlet 16, 18 are spaced-apart a distance of about 2⅛ inches, the industry standard for conduit spacing.

As shown in FIG. 4, third member 46 is also rectangular and generally the same size as first member 12. Vents 50, 52 are recesses in generally planar venting surface 48 and perpendicular thereto. Vents 50, 52 are provided between the planes formed by outlet surface 22 and equalizing valve surface 24. Mounting holes 54 extend through third member 46 and are perpendicular to its surface. Vents 50, 52 are preferably threaded to receive a valve, or the like. Additionally, another manifold can be coupled to the vents to permit transmitter stacking.

Figure 5:
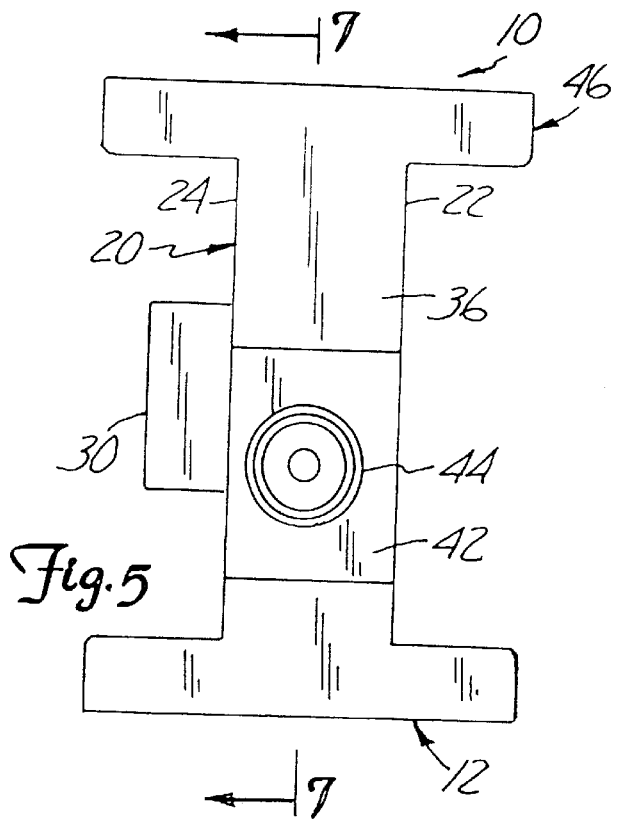
FIG. 5 shows a third end view of the manifold of FIG. 1.
Figure 6:
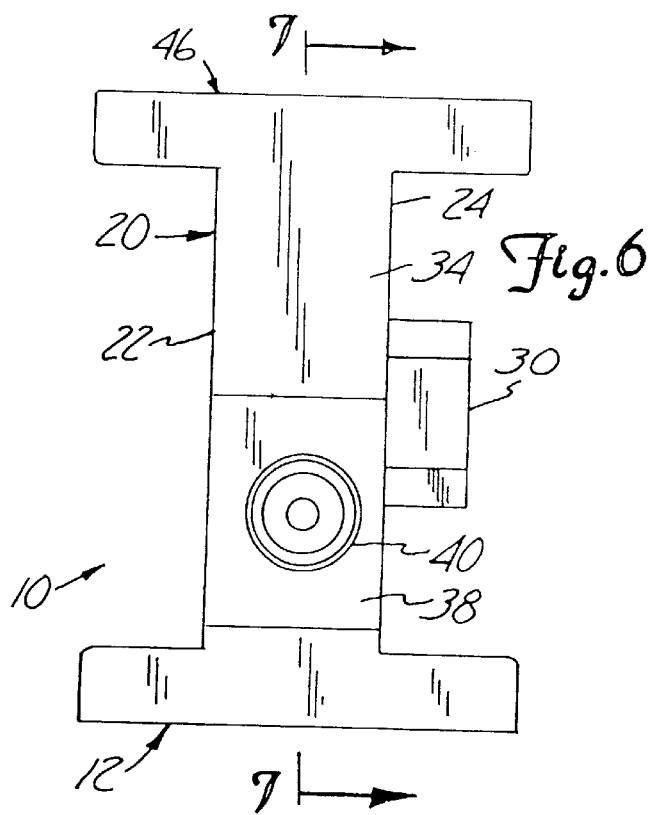
FIG. 6 shows a fourth end view of the manifold of FIG. 1.

As shown in FIGS. 5 and 6, generally cylindric blocking chambers 40, 44 are threaded recesses in bosses 38, 42, respectively. Blocking chambers 40, 44 are adapted for receiving blocking valves, described below.

Figure 7:
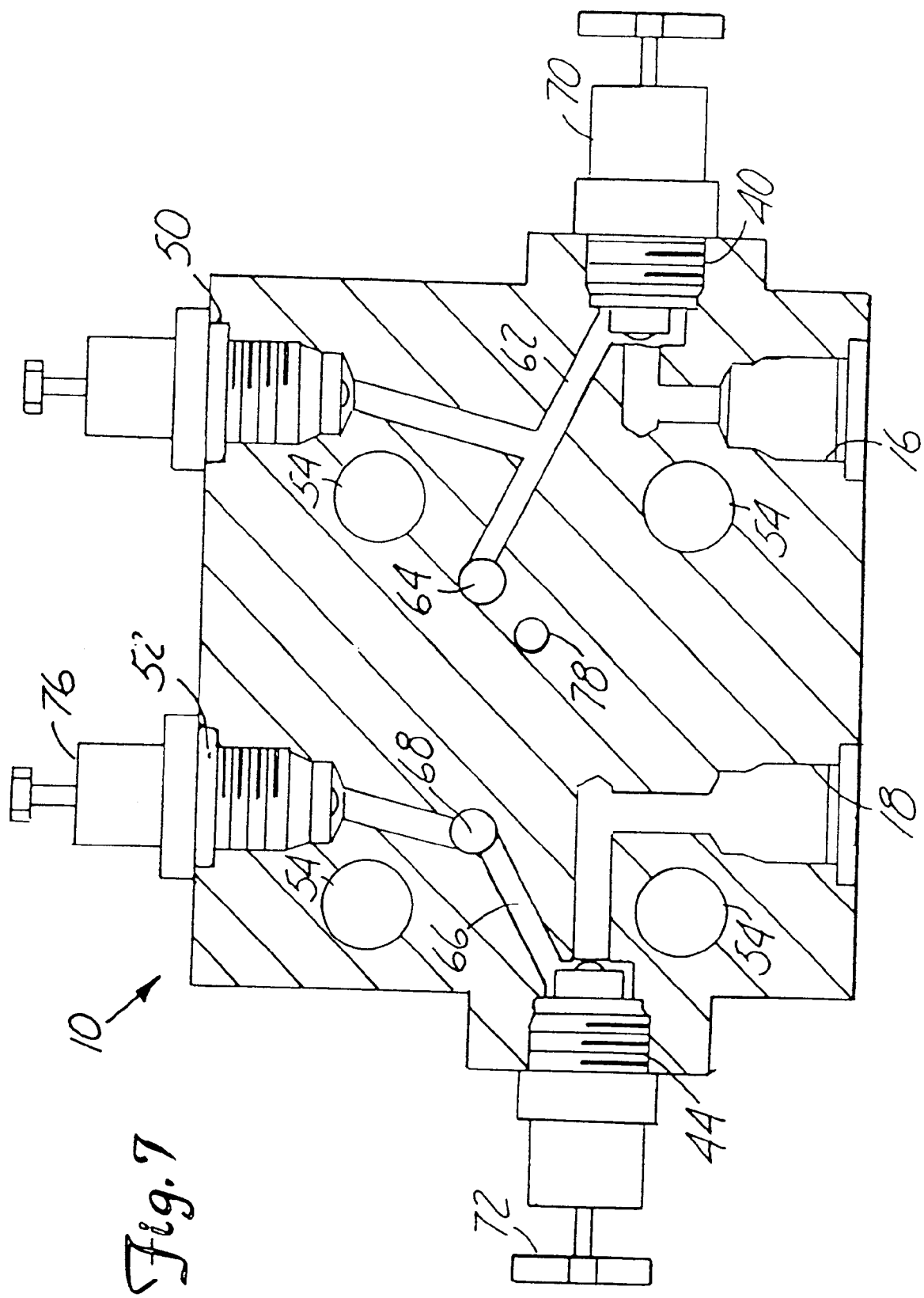
FIG. 7 shows a cross-section view of the manifold of FIG. 1.

FIG. 7 shows a cross-section of second member 20. A first passage is within second member 20 and provides communication from first inlet 16 to first blocking chamber 40 and first vent 50. First passage 62 also provides communication with first outlet 26 at first opening 64. A second passage 66 is also within second member 20 and provides communication from second inlet 18 to second blocking chamber 44 and second vent 52. Second passage 66 also provides communication with second outlet 28 at second opening 68. The openings 64, 68 are positioned to allow maximum drain potential. Blocking valves 70, 72 in blocking chambers 40, 44 selectively open and close, or "block", communication from inlets 16, 18. Also, venting valves 74, 76 selectively open and close communication of the passages 62, 66 with the atmosphere.

Figure 8:
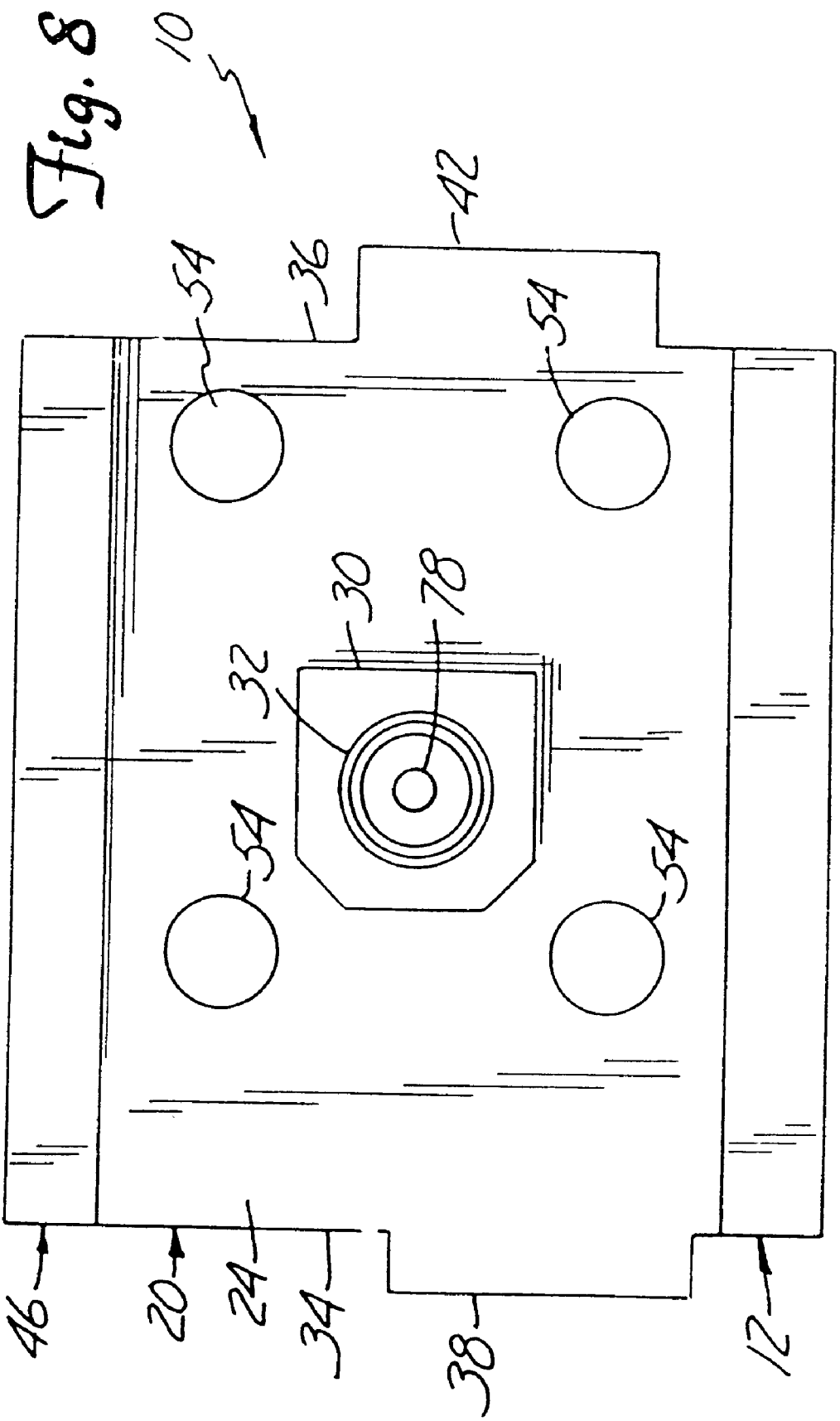
FIG. 8 shows a first side view of the manifold of FIG. 1.
Figure 9:
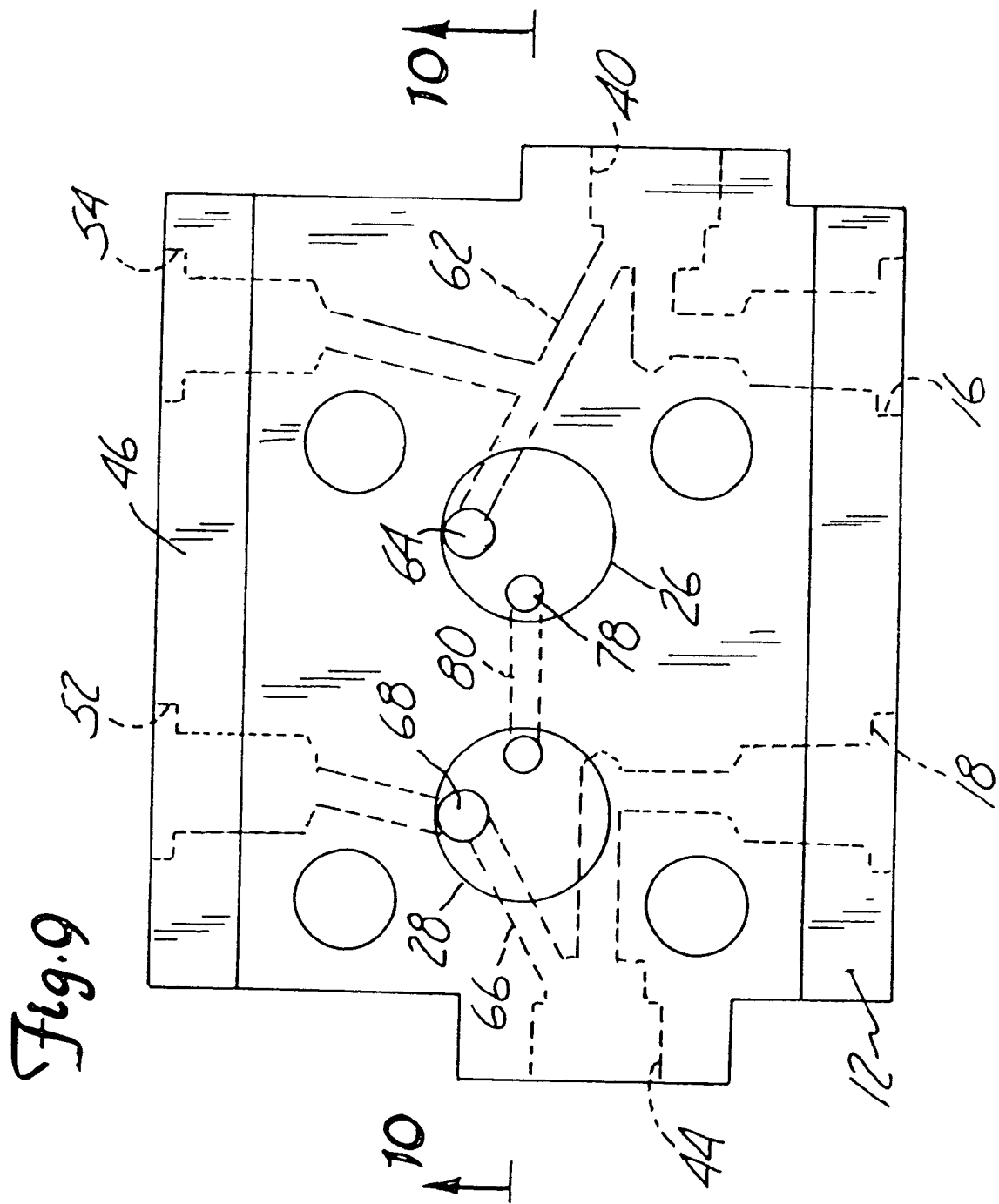
FIG. 9 shows a second side view of the manifold of FIG. 1.

As shown in FIG. 8, equalizing valve surface 24 comprises a boss 30 having a generally cylindric equalizing chamber 32 as a threaded recess therein. Equalizing chamber 32 includes an equalizing opening 78 which extends through second member 20 into outlets 26, 28, as shown in FIG. 9. Outlets 26, 28 are sealingly compatible with respect to inlet portion of transmitter 58. The sealing compatibility is due to seal rings (not shown) placed around the outlets 16, 18 and by the position of mounting holes 54 which match that of the corresponding mounting holes in transmitter 58 to receive mounting bolts 59. The sealing engagement must be fully hermetical to provide the required accuracy of measurement by transmitter 58.

Figure 10:
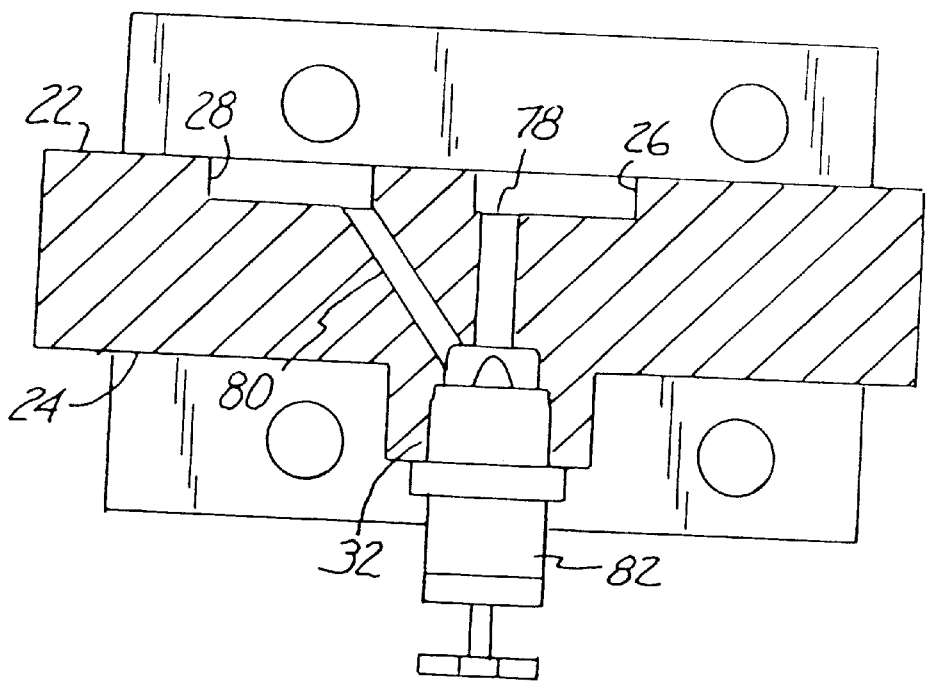
FIG. 10 shows another cross-section view of the manifold of FIG. 1.

FIG. 10 shows a cross-section of second member 20. In addition to passages 62, 66, second member 20 comprises equalizing passages 80 which provide communication between outlets 26 and 28 through equalizing chamber 32. Equalizing valve 82 in equalizing chamber 32 selectively opens and closes communication between outlets 26 and 28.

Blocking valves 70, 72, venting valves 74, 76 and equalizing valve 82 are isolator valves of a known structure which includes a valve stem portion disposed inside of members and carrying a valve member. Valves can be of identical structure each carrying, at the free end of the inside valve stem, a conical or spherical valve member. Each valve also has an actuating stem projecting outwardly from the manifold 10. The free end of each actuating stem can be provided with a handle as is well known in the art.

In one preferred mode of operation, high pressure process flow is connected by one of conduits 56a, 56b to first inlet 16, and low pressure process flow is connected by the other of conduits 56a, 56b to second inlet 18. Correspondingly, high pressure flow port of the transmitter 58 is connected to the first outlet 26 and low pressure flow port of the transmitter is connected to second outlet 28.

Figure 11:
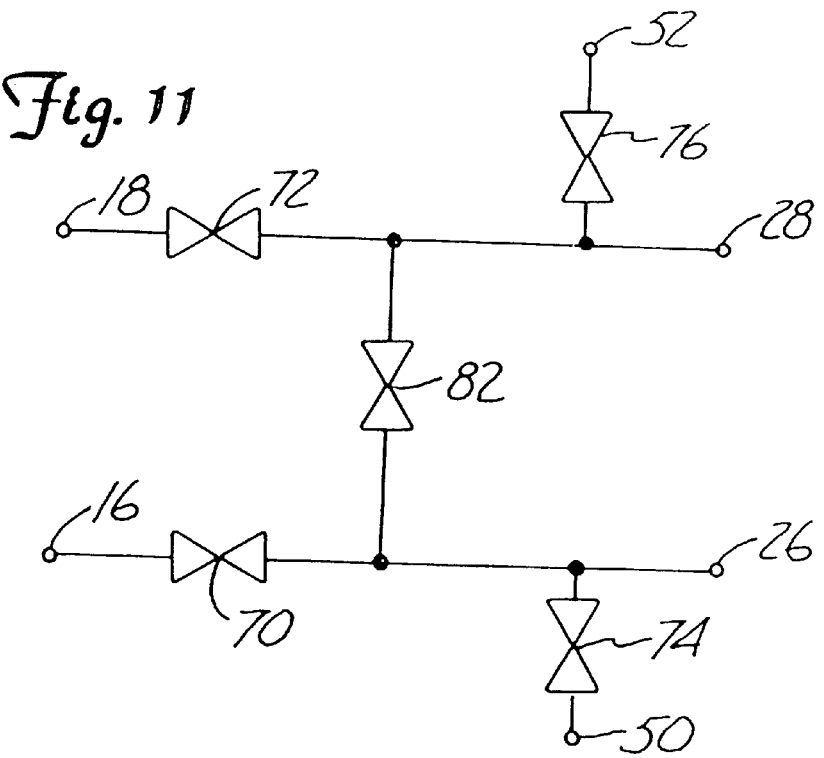
FIG. 11 is a schematic flow diagram of the manifold of FIG. 1.

A schematic representation of the manifold 10 is shown in FIG. 11. To achieve a direct communication of an inlet of a high pressure process flow to a high pressure flow port blocking valve 70 is open while blocking valve 72, venting valves 74, 76 and equalizing valve 82 are closed. To achieve a direct communication of the low pressure process flow to a low pressure flow port, blocking valve 72 is open while blocking valve 70, venting valves 74, 76 and equalizing valve 82 are closed. To achieve an equalized pressure whereby the low pressure process fluid is directed to both the high and low pressure ports, blocking valve 72 and equalizing valve 82 are open while blocking valve 70 and venting valves 74 and 76 are closed. To achieve an equalized pressure whereby the high pressure process fluid is directed to both the high and low pressure sensors, blocking valve 70 and equalizing valve 82 are open while blocking valve 72 and venting valves 74 and 76 are closed. For achieving a state where both the high and low pressure process fluid is vented at the manifold 10, resulting in zero differential pressure at the transmitter 58, all the valves are open. In order to have zero pressure at the outlets 26 and 28, blocking valves 70, 72 are closed and venting valves 74, 76 are open.

Figure 13:
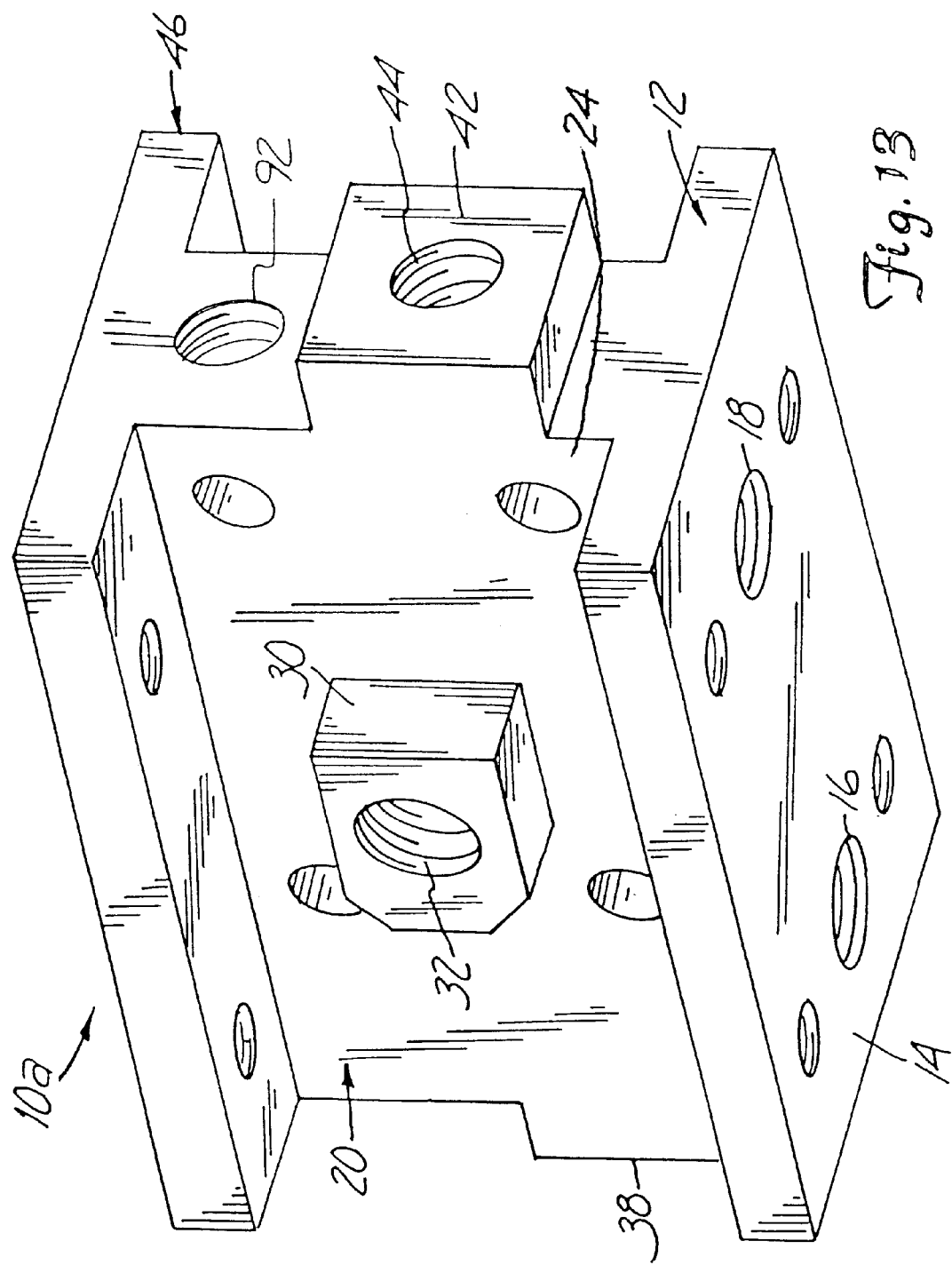
FIG. 13 shows a perspective view of another manifold embodying features of the present invention.
Figure 13A:
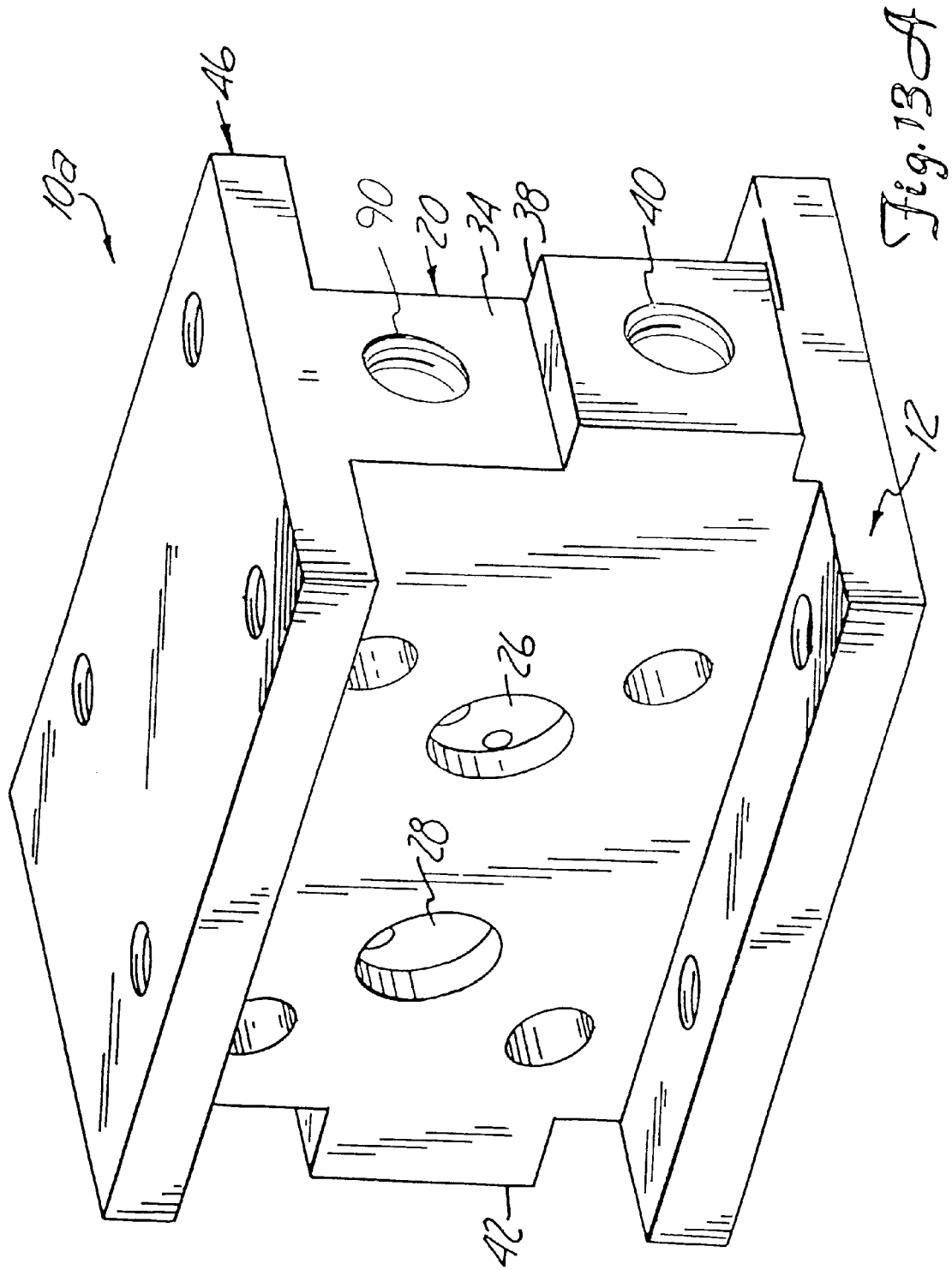
FIG. 13A shows another perspective view of the manifold of FIG. 13.

FIGS. 13 and 13A show another embodiment of the invention indicated generally as manifold 10a, wherein otherwise similar parts have similar reference numbers. Vents 90, 92 are recessed in perimeter walls 34 and 36 instead of third member 46. Vents 90, 92 are preferably threaded to receive a valve or the like, of known structure as disclosed above.

FIG. 14 shows a perspective view of another manifold embodying features of the present invention and indicated generally at 10b, wherein similar parts have similar reference numbers. Perimeters walls 34 and 36 include vent chambers 93 and 94, respectively, as threaded recesses therein. Venting chambers 93 and 94 are in communication with blocking chambers 40, 44, respectively, and are adapted to receive vent valves 95, 96 or the like. Third member 46 includes end 97 with vent ports 98a, 98b recessed therein.

Figure 15:
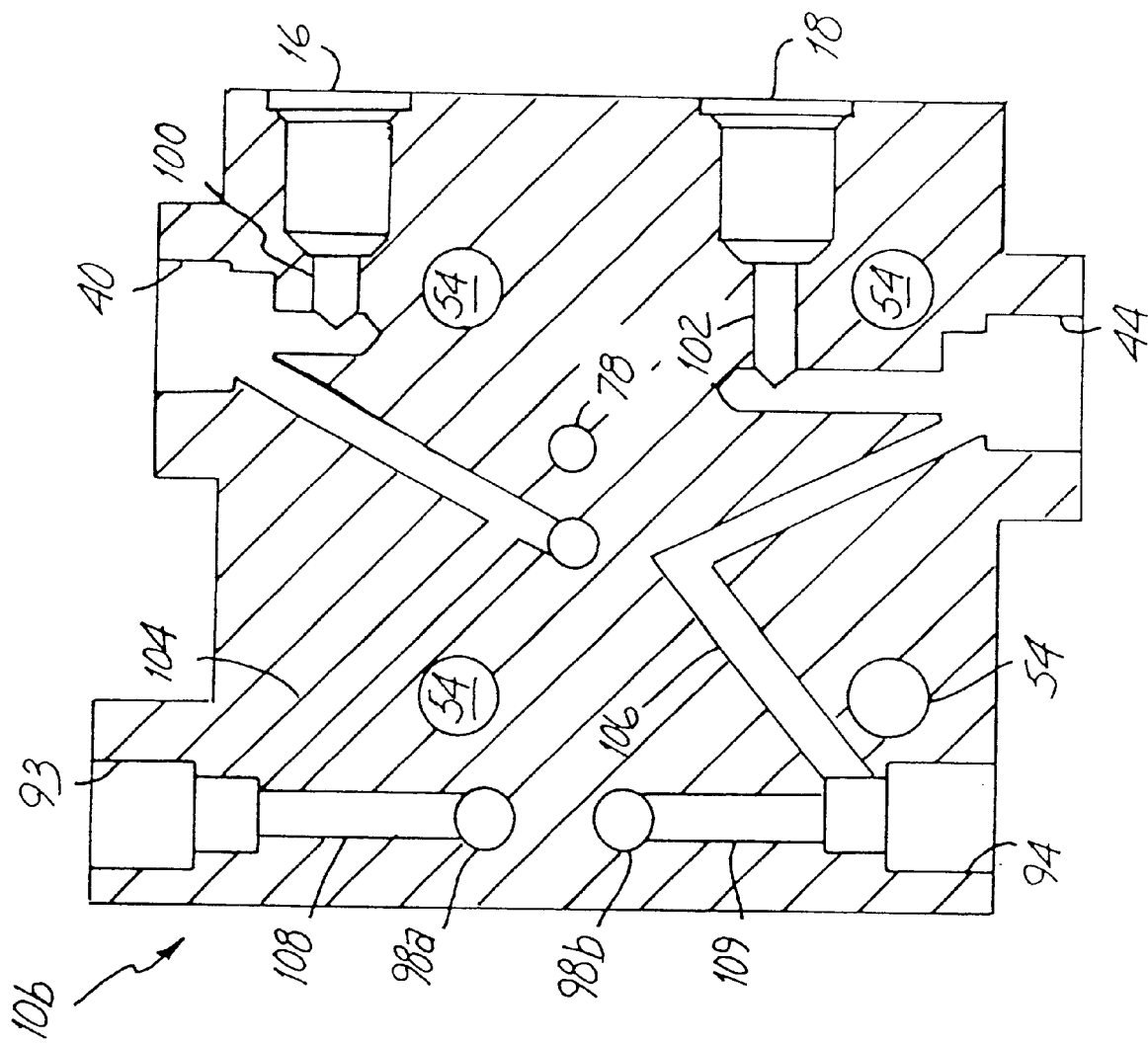
FIG. 15 shows a cross-sectional view of the manifold of FIG. 14.

FIG. 15 shows a cross-section view of the manifold 10b of FIG. 14 taker along lines 15—15, and depicting passageways therein. Inlets 16, 18 are in communication with blocking chambers 40, 44, respectively, via passageways 100, 102, respectively. Blocking chambers 40, 44 are in communication with venting chambers 93, 94, respectively, via passageways 104, 106, respectively. Additionally, venting chambers 93, 94 are in communication with vent ports 98a, 98b via passageways 108, 109, respectively. Vent ports 98a, 98b are in communication with the atmosphere.

Figure 16:
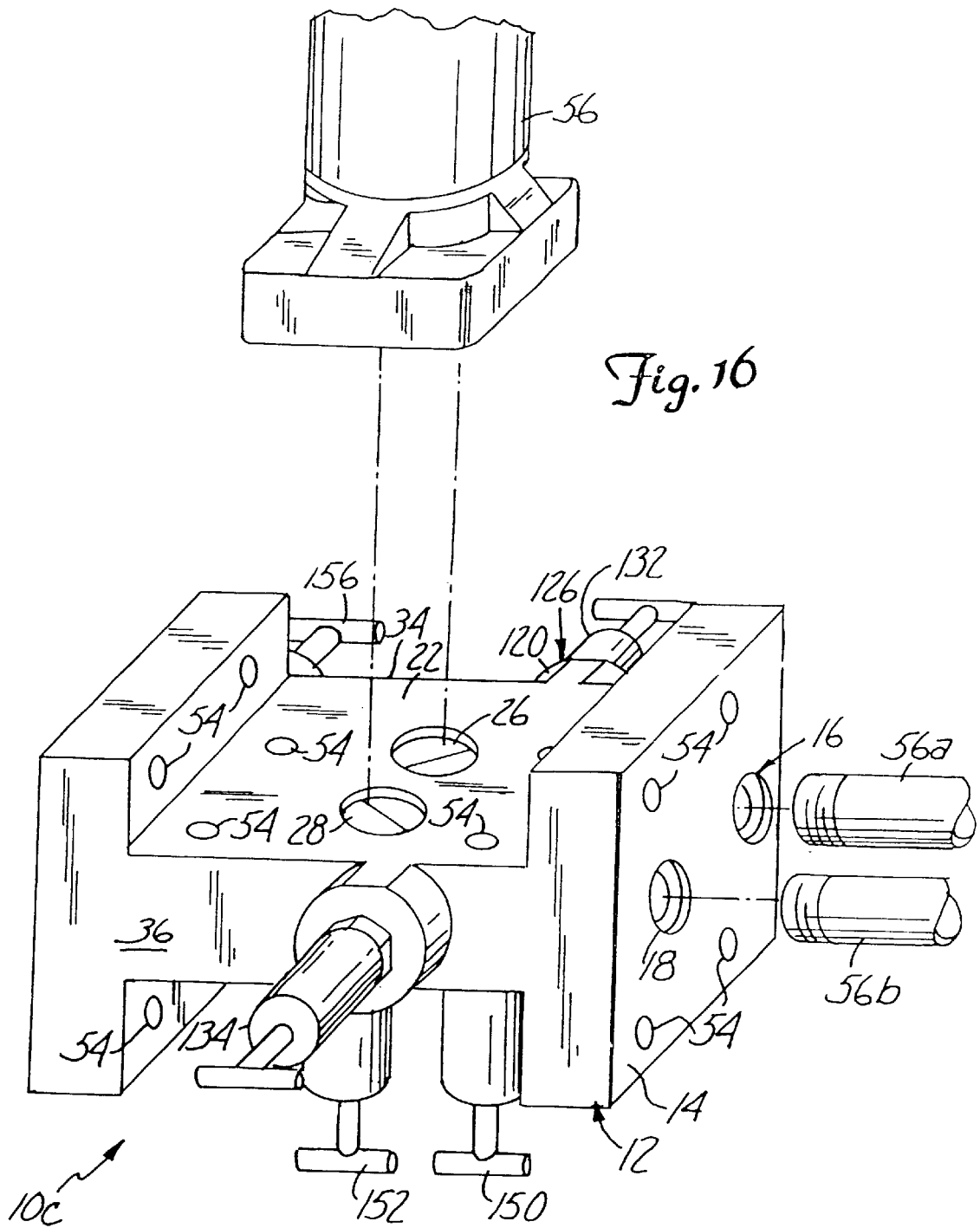
FIG. 16 shows a perspective view of another manifold embodying features of the present invention with the transmitter and process conduits.

FIG. 16 shows a perspective view of another manifold, indicated at 10c, embodying features of the present invention, and shown with process conduits 56a, 56b and transmitter 58, wherein like parts are indicated with like reference numerals. Inlet 16, 18 are adapted to receive process conduit 56, and outlets 26, 28 are adapted to receive transmitter 58. Perimeter walls 34, 36 are provided bosses 120, 122, respectively, having blocking chambers 126, 128, respectively, therein. Blocking chambers 126, 128 are adapted to receive valves 132, 134, respectively, or the like.

Figure 17:
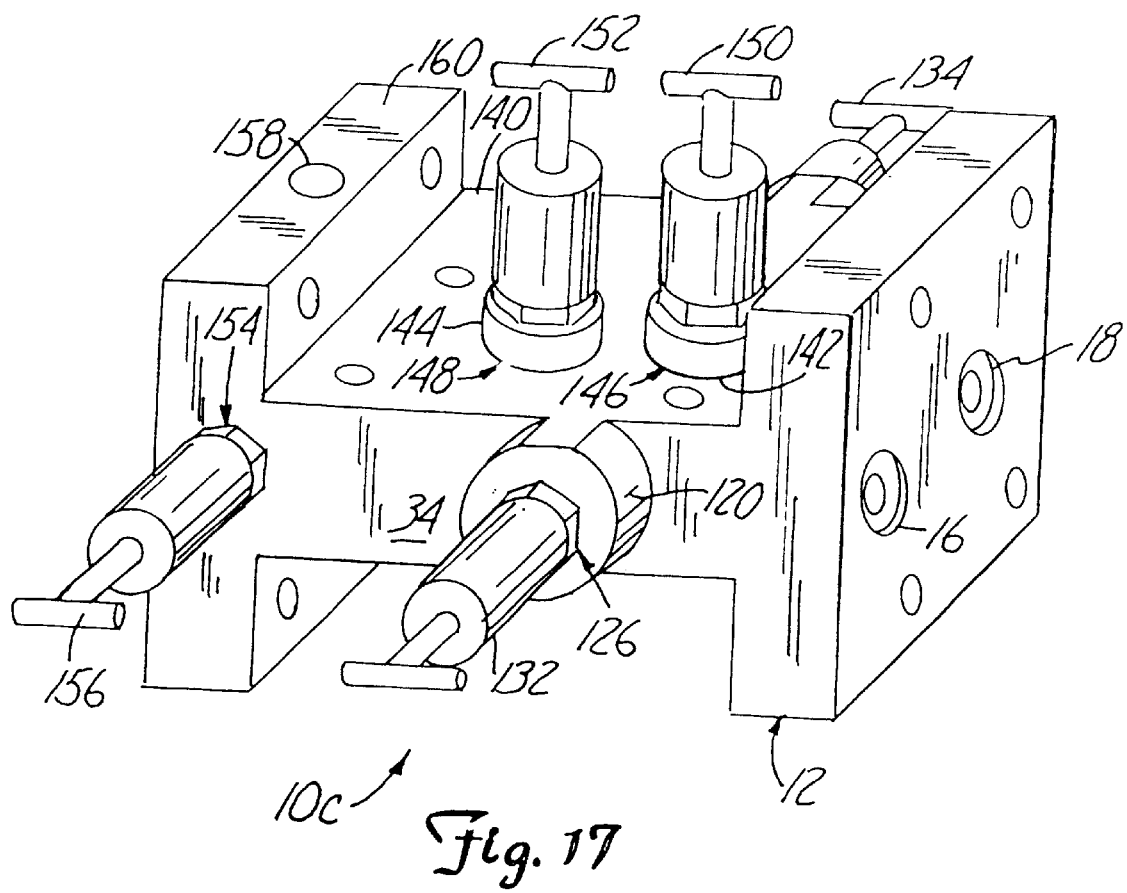
FIG. 17 shows another perspective view of the manifold of FIG. 16.

FIG. 17 shows a perspective view of manifold 10c but inverted with respect to the view of FIG. 16. Equalizing valve surface 140 is provided with bosses 142, 144 having equalizing chambers 146, 148, respectively, therein. Equalizing chambers 146, 148 are adapted to receive valves 150, 152, or the like. Perimeter wall 34 includes venting chamber 154 adapted to receive valve 156, or the like, and third member 46 includes a single vent port 158 on end 160.

Figure 18:
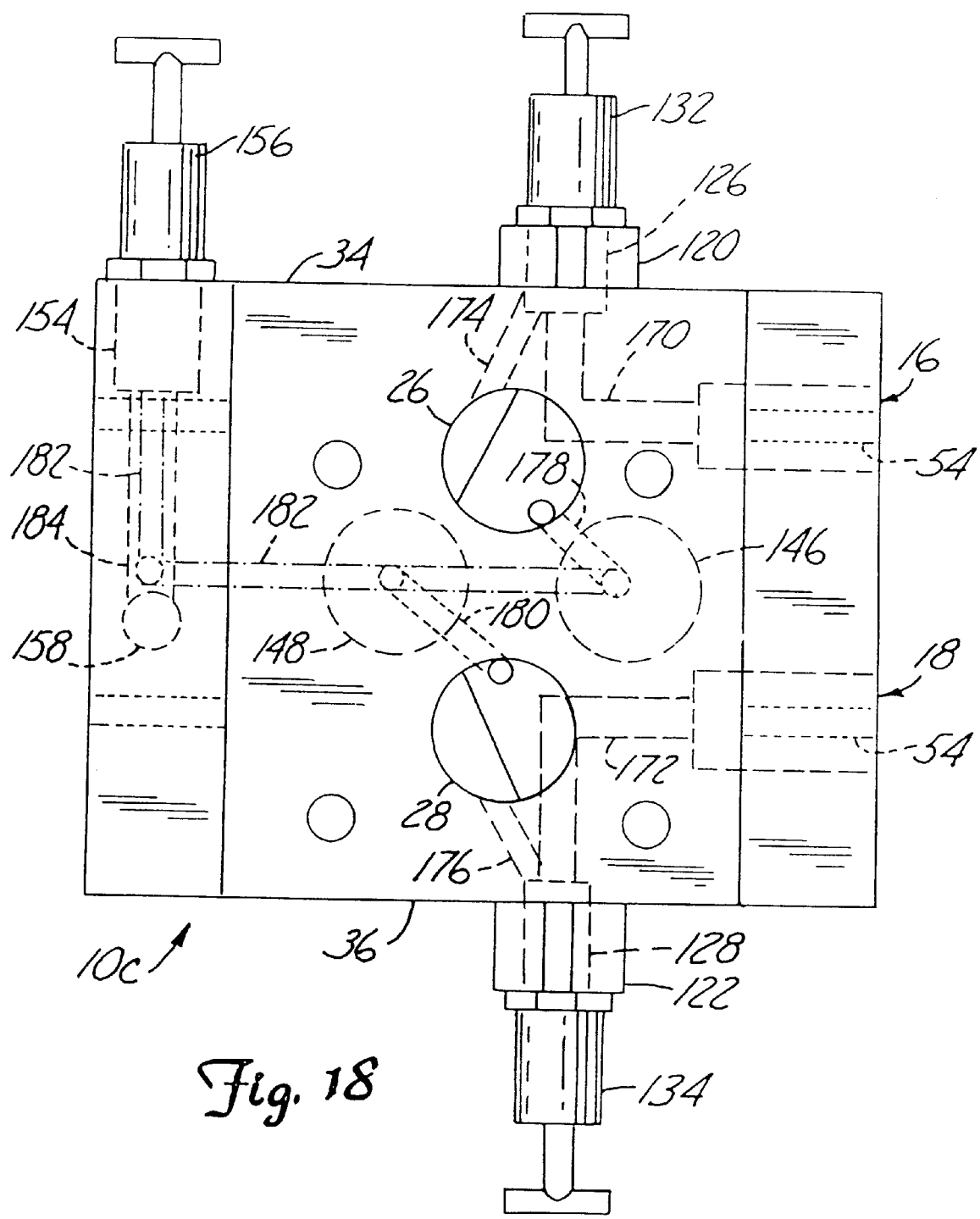
FIG. 18 shows a plan view of the manifold of FIG. 16.

FIG. 18 shows a plan view of manifold 10c oriented as in FIG. 16 and depicting passageways in phantom. Inlets 16, 18 are in communication with blocking chambers 126, 128 through passageways 170, 172, respectively. Blocking chambers 126, 128 are in communication with outlets 26, 28, respectively, via passageways 174, 176. Outlets 26, 28 are in communication with equalizing chambers 146, 148, respectively, through passageways 178, 180, respectively. Equalizing chambers 146, 148 are in communication with each other and venting chamber 154 through passageway 182. Venting chamber 154 is in communication with vent port 158 through passageway 184, and vent port 158 is in communication with the atmosphere.

Figure 19:
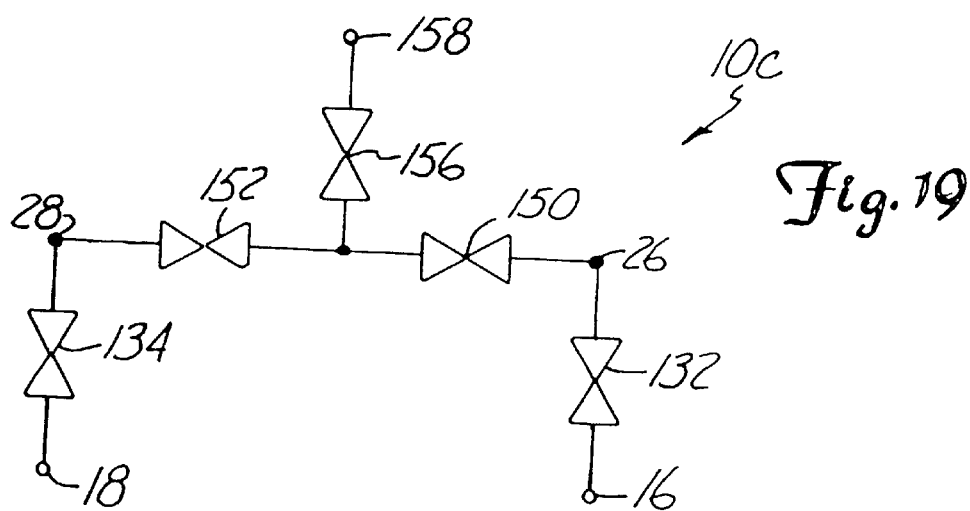
FIG. 19 is a schematic flow diagram of the manifold of FIG. 16.

A schematic representation of manifold 10 is shown in FIG. 19. In one preferred mode of operation, high pressure process flow is connected by one of conduits 56a, 56b to first inlet 16, and low pressure process flow is connected by the other of conduits 56a, 56b to second inlet 18. Correspondingly, high pressure flow port of the transmitter 58 is connected to first outlet 26 and low pressure flow port of the transmitter is connected to second outlet 28. To achieve a direct communication of an inlet of a high pressure process flow to a high pressure flow port, blocking valve 132 is open while blocking valve 134, venting valve 156 and equalizing valves 150, 152 are closed. To achieve a similar state with respect to the high pressure flow port, but where the low pressure flow port is vented, valves 152 and 156 are opened. To achieve a direct communication of the low pressure process flow to a low pressure flow port, blocking valve 134 is open while blocking valve 132, venting valve 156 and equalizing valves 150, 152 are closed. For achieving a similar state with respect to the low pressure flow port but where the high pressure flow port is vented, valves 150, 156 are opened. To achieve an equalized pressure whereby the low pressure process fluid is directed to both the high and low pressure ports, blocking valve 134 and equalizing valves 150, 152 are open while blocking valve 132 and venting valve 156 are closed. To achieve an equalized pressure whereby the high pressure process fluid is directed to both the high and low pressure sensors, blocking valve 132 and equalizing valve 150, 152 are open while blocking valve 134 and venting valve 156 are closed. For achieving a state where both the high and low pressure process fluid is vented at the manifold 10, resulting in zero differential pressure at the transmitter 58, all the valves are open. In order to have zero pressure at the outlets 26 and 28, blocking valves 130, 134 are closed and venting valve 156 and equalizing valves 150, 152 are open. During normal operation, blocking valves 132, 134 and venting valve 156 are open. Leakage of process by equalizing valves 150, 152 is vented through venting valve 156 and does not affect the opposite side outlet 26 or 28 and thus provides more accurate metering.

The previously described embodiments of the present invention have many advantages. Among these advantages is that the manifolds permit substitution of newer "co-planar" transmitters into installations previously occupied by conventional transmitters. Many older installations were designed to accommodate conventional transmitters having "H-shaped" flanges, and wider spacing between the ports. Further, some installations do not easily accommodate other manifolds for co-planar transmitters without reconfiguration of the existing conduits and the like. The manifold of the present invention integrates with existing designs and DIN spacing thus reducing overall installation costs and provides convenience.

The manifold of the present invention provides several surfaces adapted for mounting to a rigid support. Also, the "right-angle" design of the transmitter mounted perpendicularly to the process conduits provides greater flexibility in transmitter installation. For example, the manifold 10 shown in FIG. 12 can be flipped end for end such that the outlets 26 and 28 are facing the ground or floor and the transmitter will be inverted. Thus, the transmitter can be mounted in different orientations depending on the space constraints of the installation.

One preferred mounting of the flange requires inlet surface 14 to face the ground or floor wherein the second outlet 28 is oriented so that the second opening 68 is at the "top" of the second outlet 28 This permits bubbles in the outlet 28 to float directly to the vent 52 and away from the transmitter thus increasing sensor accuracy. The manifold eliminates the need for flanges and coupling assemblies, which inhibits leaks by reducing leak paths. Manifolds 10–10b are particularly suited for the power industry. Manifold 10c is particularly suited for the natural gas industry. It is to be understood, however, that the manifold of the present invention are not intended to be limited to a specific use.

Although the present invention has been described with reference to preferred embodiments, workers skilled in the art will recognize that changes may be made in form and detail without departing from the spirit and scope of the invention.

What is claimed is:

1. A manifold for use with a pressure sensing transmitter for measuring pressure of a process fluid, the manifold comprising:
   a manifold body including a first side member having an inlet surface and a cross member having an outlet surface, the outlet surface of the first side member configured to directly mount to the pressure sensing transmitter, the first side member and cross member disposed at substantially a 90° angle relative to each other;
   a first inlet on the first side member configured to couple to the process fluid;
   a first outlet on the outlet surface configured to directly couple to the pressure sensing transmitter;
   a passageway in the manifold body extending between and connecting the first inlet and the first outlet;
   a first valve configured to selectively block fluid communication between the first inlet and the first outlet; and
   wherein the plane of the inlet surface is not parallel with the plane of the outlet surface.

2. The manifold of claim 1 wherein the plane of the inlet surface is substantially perpendicular to the plane of the outlet surface.

3. The manifold of claim 1 including a second inlet on the first side member, a second outlet on the outlet surface and a passageway extending therebetween.

4. The manifold of claim 3 including a first equalization passageway coupled to the first outlet, a second equalization passageway coupled to the second cutlet and an equalization chamber selectively coupling the first equalization passageway with the second equalization passageway.

5. The manifold of claim 4 wherein the equalization chamber is configured to receive an equalization valve mounted on the cross member opposite the first and second outlets.

6. The manifold of claim 5 wherein the equalization valve has an axis, the first equalization passageway is substantially parallel with the axis and the second equalization passageway forms an acute angle with the axis.

7. The manifold of claim 4 and further comprising:
   a first blocking chamber in a first blocking chamber plane and disposed within the cross-member wherein the first blocking chamber is in direct communication with the first inlet, first outlet, and equalization chamber; and
   a second blocking chamber in a second blocking chamber plane and disposed within the cross-member wherein the second blocking chamber is in direct communication with the second inlet, second outlet, and the equalization chamber.

8. The manifold of claim 7 wherein the planes of the first and second blocking chambers are generally parallel to each other and generally perpendicular to the planes of the inlet surface and the outlet surface.

9. The manifold of claim 8 and further comprising:
   a first vent chamber in a first vent plane and in communication with the first blocking chamber;
   a second vent chamber in a second vent plane and in communication with the second blocking chamber; and
   wherein the first and second vent chambers are disposed within the manifold body.

10. The manifold of claim 9 wherein the first and second vent planes are generally parallel to the planes of the first and second blocking chambers.

11. The manifold of claim 9 wherein the first and second vent planes are generally perpendicular to the planes of the first and second blocking chambers.

12. The manifold of claim 3 including a first and second equalization chamber wherein the first equalization chamber is in communication with the first outlet, and the second equalization chamber is in communication with the second outlet.

13. The manifold of claim 12 and further comprising a vent in communication with the first and second equalization chambers.

14. The manifold of claim 13:
   wherein the first equalization chamber is configured to accept a first valve therein for selectively allowing communication between the first outlet and at least one of the second equalization chamber and the vent; and
   wherein the second equalization chamber is configured to accept a second valve therein for selectively allowing communication between the second outlet and at least one of the first equalization chamber and the vent.

15. The manifold of claim 14 and further including a vent chamber disposed within the manifold body and in communication with the vent and first and second equalization chambers.

16. The manifold of claim 3 wherein spacing between the first and second outlets is in accordance with DIN spacing requirements.

17. The manifold of claim 3 wherein the spacing is about 5.4 centimeters between the first and second outlets.

18. The manifold of claim 3 wherein the spacing is about 5.4 centimeters between the first and second inlets.

19. The manifold of claim 1 including a second side member coupled to the cross member opposite the first side member.

20. The manifold of claim 19 including a first vent passageway extending from the first outlet to a first vent on the second side member.

21. The manifold of claim 19 wherein the first and second side members and the cross member form an "H" configuration.

22. The manifold of claim 1 and adapted to receive a valve wherein the valve is mounted on the cross member and has an axis substantially parallel with the plane of the outlet surface.

23. The manifold of claim 1 and adapted to receive a second valve coupled to the passageways for selectively allowing fluid communication between the second inlets and the second outlets.

24. The manifold of claim 1 including an inlet passageway extending between the first inlet and the first valve and having an axis substantially parallel with an axis of the first valve and an outlet passageway extending between the first valve and the first outlet and having an axis which forms an acute angle with the axis of the first valve.

25. An H-manifold for use with a pressure sensing transmitter for measuring pressure of a process fluid, the H-manifold comprising:
   an inlet face on an inlet portion having a first inlet for coupling to a first pressure source;
   a cross portion coupled to the inlet face having a mounting face for directly mounting to the pressure sensing transmitter, the mounting face substantially perpendicular to the inlet face, the mounting face including a first pressure outlet;
   an opposing face on an opposing portion coupled to the cross portion, opposite the inlet face, wherein the inlet face, cross portion and opposing face form an "H" configuration;
   a first passageway extending between the first inlet and the first outlet; and a fist valve configured to selectively block fluid communication between the first inlet and the first outlet.

26. The H-manifold of claim 25 wherein the inlet face includes a second inlet and the cross portion includes a second outlet, the H-manifold further including a second passageway extending between the first inlet and the first outlet.

27. The H-manifold of claim 25 including:
a first blocking chamber in communication with the first inlet and the first outlet, the first blocking chamber configured to receive a first valve mounted on the cross portion for selectively coupling the first inlet to the first outlet.

28. The H-manifold of claim 25 including:
a first blocking chamber in communication with the first inlet and the first outlet, the first blocking chamber configured to receive a first valve mounted on the cross portion for selectively coupling the first inlet to the first outlet; and
a second blocking chamber in communication with the second inlet and second outlet, the second blocking chamber configured to receive a second valve mounted on the cross portion for selectively coupling the second inlet to the second outlet.

29. The H-manifold of claim 28 wherein the first and second valves have axes which are substantially parallel to a plane of the cross portion.

30. The manifold of claim 26 and further comprising an equalization chamber in communication with the first and second outlets.

31. The manifold of claim 30 wherein the equalization chamber is in direct communication with the first and second outlets.

32. The manifold of claim 30 and further including a vent in communication with the equalization chamber.

33. The manifold of claim 30 and further comprising a second equalization chamber in direct communication with the second outlet and the first equalization chamber.

34. The manifold of claim 33 wherein the first and second equalization chambers are each adapted for accepting a valve therein.

35. The manifold of claim 30 wherein the equalization chamber is adapted for accepting a valve therein.

36. The H-manifold of claim 26 including,
a first equalization passageway coupled to the first outlet;
a second equalization passageway coupled to the second outlet; and
an equalization chamber in communication with the first and second equalization passageways, wherein the equalization chamber is configured to receive a valve coupled to the cross portion opposite the first and second outlets for selectively connecting the first and second equalization passageways.

37. The H-manifold of claim 36 wherein the equalization valve has an axis substantially perpendicular with the mounting face of the cross portion.

38. The H-manifold of claim 25 including:
a first vent passageway extending from the first outlet to a vent on the opposing portion.

39. The H-manifold of claim 25 wherein the opposing portion includes mounting holes for mounting to a support.

40. The H-manifold of claim 25 wherein the inlet portion includes mounting holes for mounting to a support stand.

* * * * *